US012046807B2

(12) United States Patent
Ambe et al.

(10) Patent No.: US 12,046,807 B2
(45) Date of Patent: Jul. 23, 2024

(54) ANTENNA DEVICE FOR VEHICLE

(71) Applicant: YOKOWO CO., LTD., Tokyo (JP)

(72) Inventors: Tomio Ambe, Tomioka (JP); Ryota Tamai, Tomioka (JP); Takeshi Hirosawa, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 304 days.

(21) Appl. No.: 17/429,662

(22) PCT Filed: Dec. 16, 2019

(86) PCT No.: PCT/JP2019/049132

§ 371 (c)(1),
(2) Date: Aug. 10, 2021

(87) PCT Pub. No.: WO2020/174818

PCT Pub. Date: Sep. 3, 2020

(65) Prior Publication Data

US 2022/0109232 A1 Apr. 7, 2022

(30) Foreign Application Priority Data

Feb. 26, 2019 (JP) ................................ 2019-032645

(51) Int. Cl.

*H01Q 1/32* (2006.01)
*H01Q 1/48* (2006.01)
*H01Q 1/42* (2006.01)

(52) U.S. Cl.

CPC ............ *H01Q 1/3275* (2013.01); *H01Q 1/48* (2013.01); *H01Q 1/42* (2013.01)

(58) Field of Classification Search

CPC .......... H01Q 1/3275; H01Q 1/48; H01Q 1/42; H01Q 21/28

See application file for complete search history.

(56) References Cited

U.S. PATENT DOCUMENTS

| | | | | |
|---|---|---|---|---|
| 8,836,604 B2 * | 9/2014 | Yang | H01Q 1/3275 343/872 |
| 2007/0279304 A1 | 12/2007 | Chakam et al. | |

(Continued)

FOREIGN PATENT DOCUMENTS

| | | |
|---|---|---|
| JP | 2011-109296 A | 6/2011 |
| JP | 2011109296 A * | 6/2011 |

(Continued)

OTHER PUBLICATIONS

International Search Report and Written Opinion mailed on Mar. 17, 2020, received for PCT Application PCT/JP2019/049132, Filed on Dec. 16, 2019, 12 pages including English Translation.

*Primary Examiner* — Seokjin Kim
(74) *Attorney, Agent, or Firm* — XSENSUS LLP

(57) ABSTRACT

In an antenna device for vehicle including a plurality of antennas, it is to be not increased the dimension of a portion disposed above a flat region of a roof is eliminated. An antenna device for vehicle 1 includes: a first antenna element 31 and a second antenna element 32. At least an upper portion of the first antenna element 31 is covered with a protruding region 71 of a resin roof. The second antenna element 32 is disposed below a flat region 72. The antenna device for vehicle 1 further includes a ground plate 22. The ground plate 22 is larger than the second antenna element 32.

9 Claims, 8 Drawing Sheets

(56) References Cited

U.S. PATENT DOCUMENTS

| | | | | |
|---|---|---|---|---|
| 2008/0180332 | A1* | 7/2008 | Noro | H01Q 9/0407 343/713 |
| 2010/0177003 | A1* | 7/2010 | Bashir | H01Q 19/005 343/834 |
| 2011/0298678 | A1 | 12/2011 | Petrucci et al. | |
| 2015/0123854 | A1* | 5/2015 | Chakam | H01Q 1/1214 343/702 |
| 2018/0053992 | A1* | 2/2018 | Mizutani | B60R 11/02 |
| 2019/0312342 | A1* | 10/2019 | Sautter | H01Q 1/3275 |
| 2021/0057806 | A1* | 2/2021 | Katsura | H01Q 3/26 |
| 2021/0356279 | A1* | 11/2021 | Szigeti | G01C 21/3407 |
| 2022/0037776 | A1* | 2/2022 | Sung | H01Q 1/3275 |

FOREIGN PATENT DOCUMENTS

| | | | | |
|---|---|---|---|---|
| JP | 2016-522613 | A | 7/2016 | |
| JP | 6314277 | B1 | 4/2018 | |
| WO | 2016/147815 | A1 | 9/2016 | |
| WO | WO-2016147815 | A1 * | 9/2016 | B60R 11/02 |
| WO | WO-2016192936 | A1 * | 12/2016 | H01Q 1/1214 |
| WO | WO-2019092255 | A1 * | 5/2019 | H01Q 1/1214 |

* cited by examiner

ANTENNA DEVICE FOR VEHICLE

CROSS-REFERENCE TO RELATED APPLICATIONS

The present application is based on PCT filing PCT/JP2019/049132, filed Dec. 16, 2019, which claims priority to JP 2019-032645, filed Feb. 26, 2019, the entire contents of each are incorporated herein by reference.

TECHNICAL FIELD

The present invention relates to an antenna device for vehicle.

BACKGROUND ART

A known antenna device for vehicle including a plurality of antennas has been proposed as in Patent Literature 1.

CITATION LIST

Patent Literature

Patent Literature 1: U.S. Pat. No. 8,836,604

SUMMARY OF INVENTION

Technical Problem

However, each of such antennas is housed within a case located above the flat region of the roof of a vehicle, which creates a need for increasing at least one of the dimension in the front-and-rear direction and the dimension in the left-and-right direction of the antenna device for vehicle including said case.

Therefore, an example of an object of the present invention is to be not increased the dimension of a portion disposed above the flat region of a roof, in an antenna device for vehicle including a plurality of antennas.

Solution to Problem

An antenna device for vehicle according to the present invention includes: a first antenna element; and a second antenna element. A resin roof has a protruding region and a flat region around a lower end of the protruding region, and at least an upper portion of the first antenna element is covered with the protruding region. The second antenna element is disposed below the flat region.

Advantageous Effects of Invention

As described above, the present invention enables to be not increased the dimension of a portion disposed above the flat region of a roof, in an antenna device for vehicle including a plurality of antennas.

DESCRIPTION OF EMBODIMENTS

Figure 1:
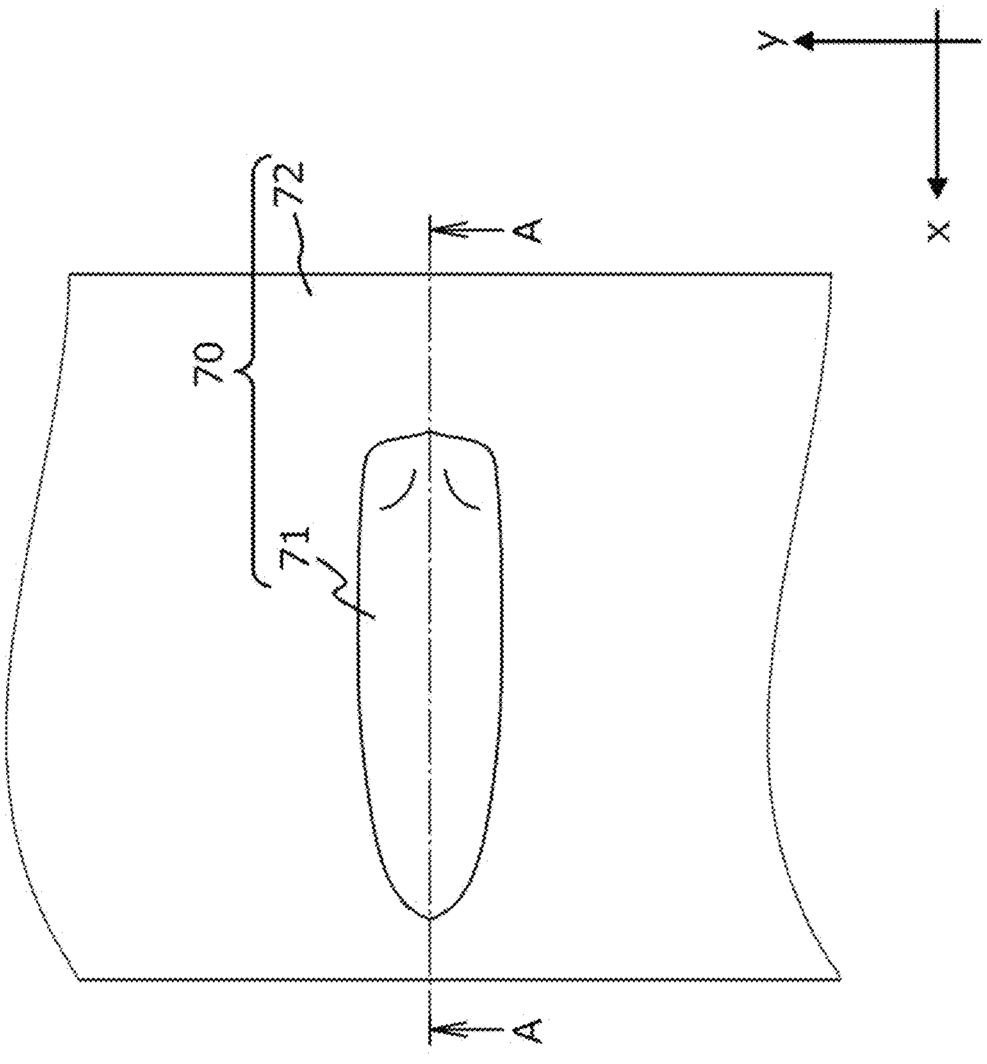
FIG. 1 is a top view of a resin roof covering an antenna device for vehicle according to first embodiment to third embodiment.

Hereinafter, a first embodiment will be described with reference to the drawings.

Note that embodiments are not limited to the following embodiments. In addition, the contents described in one embodiment are similarly applied to the other embodiments in principle. Furthermore, each embodiment and each modification can be combined appropriately.

As illustrated in FIGS. 1 to 4, an antenna device for vehicle 1 according to the first embodiment includes a first antenna case 11, a second antenna case 12, a base 21, a ground plate 22, a first antenna element 31, a second antenna element 32, a third antenna element 33, a fourth antenna element 34, a fifth antenna element 35, a first substrate 41, a second substrate 42, a first connector 51, a second connector 52, and a cable 53.

In order to describe directions, the front-and-rear direction of a vehicle to which the antenna device for vehicle 1 is attached is defined as the x direction, the left-and-right direction orthogonal to the x direction is defined as the y direction, and a substantially vertical direction orthogonal to the x direction and the y direction is defined as the z direction.

Figure 2:
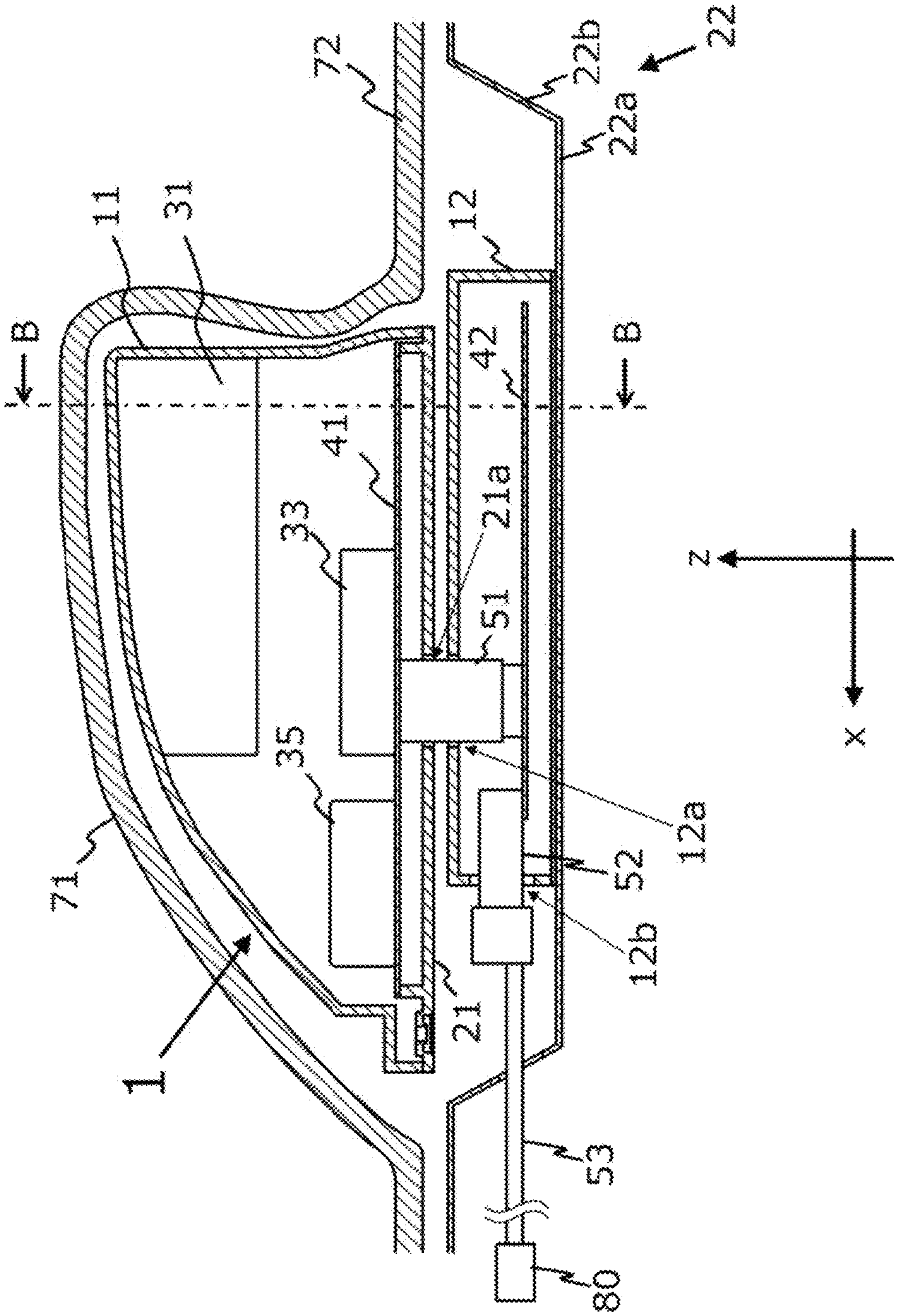
FIG. 2 is a section view taken along line A-A of FIG. 1, and illustrates the configuration of the antenna device for vehicle according to the first embodiment.

In FIG. 2, the directions indicated by the respective arrows of the x axis and the z axis are defined as a front direction and an up direction.

Figure 3:
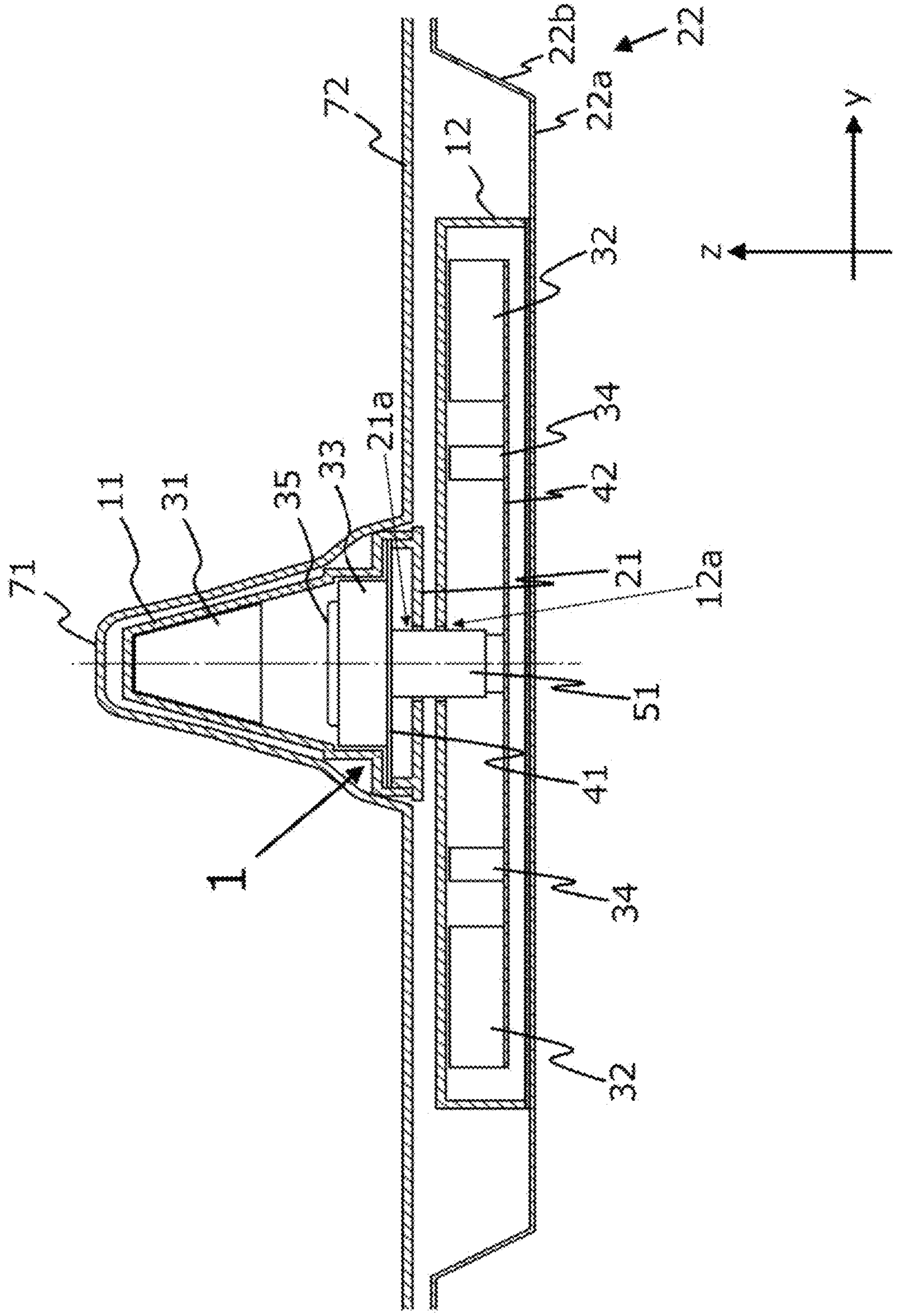
FIG. 3 is a section view taken along line B-B of FIG. 2.
Figure 4:
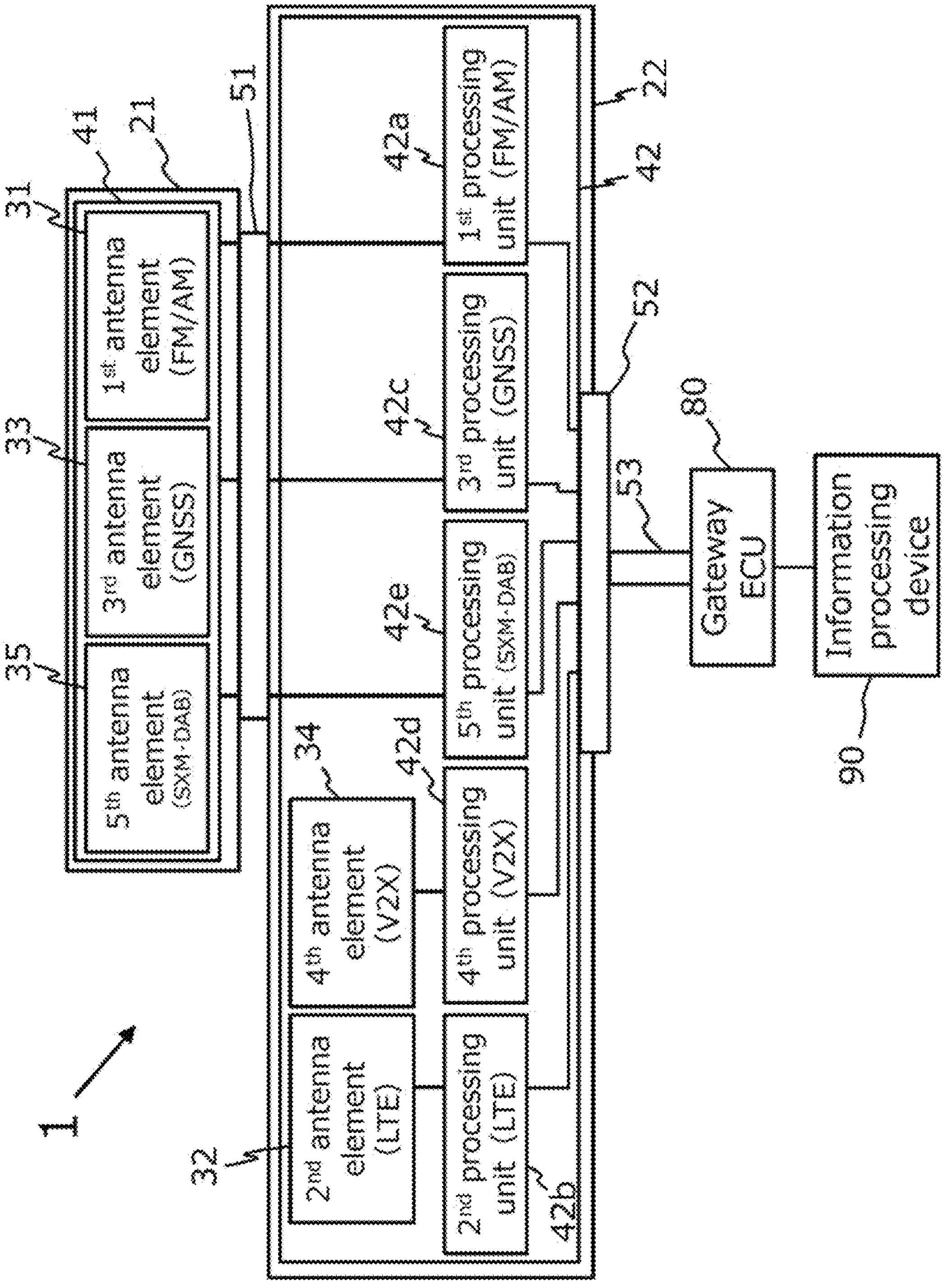
FIG. 4 is a schematic diagram of each member of the antenna device for vehicle according to the first embodiment.

In FIG. 3, the directions indicated by the respective arrows of the y axis and the z axis are defined as a right direction and an up direction.

(First Antenna Case 11, Second Antenna Case 12)

Next, the first antenna case 11 and the second antenna case 12 will be described.

The first antenna case 11 is made of synthetic resin having radio-wave transparency.

The first antenna case 11 inclines such that the front portion in the x direction is lower in level than the rear portion in the x direction, and has a substantially trapezoidal shape in section in the y direction.

A lower surface of the first antenna case 11 is open. The base 21 is attached to the opening of the lower surface of the first antenna case 11.

The first antenna element 31, the third antenna element 33, the fifth antenna element 35, and the first substrate 41 are housed in a space formed by the first antenna case 11 and the base 21.

At least the upper portion of the first antenna case 11 is covered with a protruding region 71 of a resin roof 70 of the vehicle to be described below.

The second antenna case 12 has a substantially rectangular parallelepiped shape.

The dimension in the y direction of the substantially rectangular parallelepiped shape constituting the second antenna case 12 is larger than the dimension in the y direction of the base 21.

At least an upper surface and side surfaces of the substantially rectangular parallelepiped shape constituting the second antenna case 12 are made of synthetic resin having radio-wave transparency.

The second antenna element 32, the fourth antenna element 34, and the second substrate 42 are housed in the second antenna case 12.

The second antenna case 12 is disposed below the base 21 such that the base 21 is located above the vicinity of the center in the y direction of the second antenna case 12.

The upper surface of the second antenna case 12 has a first through hole 12*a* through which the first connector 51 passes.

The second antenna case 12 holds the base 21 through the first connector 51.

However, the base 21 may be held by the second antenna case 12 though another holding member (not illustrated).

The side surface of the second antenna case 12 has a second through hole 12*b* through which the second connector 52 passes.

Note that the "case" described in the claims and aspects provided in the present specification to be described below corresponds to the second antenna case 12 of the first embodiment.

(Base 21, Ground Plate 22)

Next, the base 21 and the ground plate 22 will be described.

The base 21 is a metal plate holding the first antenna case 11 and the first substrate 41.

The first antenna case 11 is attached to the outer periphery of the base 21 by snap fastening or the like.

Thus, the xy plane of the base 21 has substantially the same size as the opening of the lower surface of the first antenna case 11.

The first substrate 41 is attached on the base 21 by screwing or the like.

The base 21 has a third through hole 21*a* through which the first connector 51 passes.

The ground plate 22 is a metal plate holding the second antenna case 12.

The ground plate 22 is disposed below the second substrate 42 in the z direction.

The ground plate 22 has a holding surface 22*a* substantially parallel to a flat region 72 of the resin roof 70.

The holding surface 22*a* has an area larger than the outer shape of the lower surface of the second antenna case 12.

That is, the holding surface 22*a* has the area larger than an area viewed in the z direction of the second antenna element 32 attached to the second antenna case 12.

In addition, the holding surface 22*a* has the area larger than an area viewed in the z direction of the fourth antenna element 34 attached to the second antenna case 12.

The second antenna case 12 is attached on the holding surface 22*a* by screwing or the like.

The ground plate 22 has a recessed shape in which the portion of the holding surface 22*a* is recessed lower in level than a region 22*b* around the holding surface 22*a*.

However, as in a third embodiment (see FIGS. 7 and 8) to be described below, the ground plate 22 may have only the holding surface 22*a* with no region 22*b* around the holding surface 22*a*.

The ground plate 22 is provided between the resin roof 70 and a roof lining (not illustrated) of the vehicle.

In one embodiment, a metal member of part of the vehicle such as a frame or a metal roof may constitute the ground plate 22. In another embodiment, a metal member separate from the vehicle may constitute the ground plate 22.

The first embodiment and a second embodiment to be described below exemplify that a metal member of part of the vehicle constitutes the ground plate 22.

For example, one embodiment is conceivable in which part of the metal roof holding the resin roof 70 constitutes the ground plate 22, below the resin roof 70.

The third embodiment to be described below exemplifies that a metal member separate from the vehicle constitutes the ground plate 22.

(First Antenna Element 31 to Fifth Antenna Element 35)

Next, the first antenna element 31 to the fifth antenna element 35 will be described.

The first antenna element 31 includes an antenna element for reception of terrestrial broadcasting such as FM broadcasting and AM broadcasting.

The first antenna element 31 is composed of, for example, a capacitance loading element and a coil.

The first antenna element 31 is attached to the inner wall of the first antenna case 11 or to the first substrate 41.

The first embodiment exemplifies that the capacitance loading element of the first antenna element 31 is attached to the inner wall of the first antenna case 11.

However, the capacitance loading element of the first antenna element 31 may be attached to the outer wall of the first antenna case 11.

At least the upper portion of the first antenna element 31 is covered with the protruding region 71 of the resin roof 70 to be described below.

The second antenna element 32 includes an antenna element for mobile communication using a telephone line.

The second antenna element 32 is used to perform transmission and reception of information to and from a base station for mobile phones.

The second antenna element 32 is attached on the second substrate 42 inside the second antenna case 12.

The second antenna element 32 is disposed at each end or the like in the y direction of the second antenna case 12 so as not to overlap the first antenna case 11 in the z direction in positional relationship.

The second antenna element 32 is composed of, for example, a slit antenna or a slot antenna.

The second antenna element 32 is provided below the first substrate 41 in the z direction.

In addition, the second antenna element 32 is disposed below the flat region 72 of the resin roof 70 to be described below, in the z direction.

That is, part of the flat region 72 is located above the second antenna element 32 in the z direction.

The third antenna element 33 includes an antenna element for a GNSS (a global navigation satellite system).

The third antenna element 33 is used to perform reception of, from a global positioning system (GPS) satellite or the like, the position information and time information of said satellite.

In the z direction, the third antenna element 33 is provided above the first substrate 41 and provided below compared to the upper end of the first antenna element 31.

In addition, the third antenna element 33 is disposed at a position where it overlaps the capacitance loading element of the first antenna element 31 in the z direction.

The third antenna element 33 is composed of, for example, a patch antenna.

The fourth antenna element 34 includes an antenna element in order to perform vehicle-to-vehicle communication, road-to-vehicle communication, or communication between a vehicle and a mobile terminal (V2X communication), based on the IEEE 802.11p standard.

The fourth antenna element 34 is used to perform transmission and reception of information with another vehicle, a roadside device, or a mobile terminal which are located at a short distance. The term "another vehicle" here means a vehicle different from the vehicle with the fourth antenna element 34 attached.

The fourth antenna element 34 is disposed closer to the center in the y direction than the region where the second antenna element 32 of the second antenna case 12 is disposed so as not to overlap the first antenna case 11 in the z direction in positional relationship.

That is, the fourth antenna element 34 is disposed at a position where it does not overlap the second antenna element 32 in the z direction.

The fourth antenna element 34 is composed of, for example, a monopole antenna or a patch antenna.

The fourth antenna element 34 is provided below the first substrate 41 in the z direction.

In addition, the fourth antenna element 34 is disposed below in the z direction to a region in the flat region 72 of the resin roof 70 which is described below, which faces the fourth antenna element 34 in the z direction.

The fifth antenna element 35 includes an antenna element for reception of digital broadcasting such as SXM (Sirius XM) or DAB (Digital Audio Broadcast).

The fifth antenna element 35 is provided ahead of the third antenna element 33 in the x direction. In the z direction, the fifth antenna element 35 is provided above the first substrate 41 and provided below compared to the upper end of the first antenna element 31.

In addition, the fifth antenna element 35 is disposed at the position where it does not overlap the capacitance loading element of the first antenna element 31 in the z direction.

Furthermore, the fifth antenna element 35 is disposed at the position where it does not overlap the second antenna element 32 in the z direction.

The fifth antenna element 35 is composed of, for example, a patch antenna.

Note that the "third antenna element" described in the claims and aspects provided in the present specification to be described below corresponds to at least one of the fourth antenna element 34 and the fifth antenna element 35 of the first embodiment to third embodiment.

(First Substrate 41, Second Substrate 42)

Next, the first substrate 41 and the second substrate 42 will be described.

The first substrate 41 is electrically connected to the coil of the first antenna element 31. The first substrate 41 mounts a circuit related to the first antenna element 31, the third antenna element 33, a circuit related to the third antenna element 33, the fifth antenna element 35, and a circuit related to the fifth antenna element 35. The circuit related to the first antenna element 31 is an amplifier circuit, a tuned circuit, or the like.

The first substrate 41 is attached on the base 21.

The base 21 and the first substrate 41 are disposed at substantially the same height in the z direction as the flat region 72 of the resin roof 70.

The second substrate 42 mounts the second antenna element 32, a circuit related to the second antenna element 32, the fourth antenna element 34, a circuit related to the fourth antenna element 34, and a signal processing unit.

In addition, the second substrate 42 is electrically connected to the first substrate 41 though the first connector 51.

The signal processing unit of the second substrate 42 is connected to a gateway ECU 80 through the cable 53 for an in-vehicle LAN (Local Area Network). The signal processing unit of the second substrate 42 performs mutual conversion between a digital signal and an analog signal. Specifically, the signal processing unit of the second substrate 42 performs transmission and reception, to and from the gateway ECU 80, of signals received through the first antenna element 31 to the fifth antenna element 35 and of signals to be transmitted through the second antenna element 32 and the fourth antenna element 34, in digital-signal form.

The signal processing unit of the second substrate 42 includes a first processing unit (FM/AM tuner) 42*a*, a second processing unit (communication module) 42*b*, a third processing unit (position calculation module) 42*c*, a fourth processing unit (V2X module) 42*d*, and a fifth processing unit (SXM/DAB module) 42*e*.

The first processing unit 42*a* to the fifth processing unit 42*e* are achieved by, for example, a processor.

Note the term "the processor" here is, for example, a CPU (central processing unit), a GPU (graphics processing unit), an application specific integrated circuit (ASIC), a programmable logic device (PLD), or a field programmable gate array (FPGA).

(First Processing Unit 42*a* to Fifth Processing Unit 42*e*)

Next, the first processing unit 42*a* to the fifth processing unit 42*e* of the second substrate 42 will be described.

The first processing unit (FM/AM tuner) 42*a* is connected to the first antenna element 31 through the first connector 51 and the first substrate 41.

The first processing unit 42*a* performs tuning/demodulation processing and A/D conversion for signal processing through the first antenna element 31.

A control signal from an information processing device 90 and regarding FM/AM broadcasting is transmitted to the first processing unit 42*a* though the gateway ECU 80, the cable 53, and the second connector 52. The first processing unit 42*a* operates on the basis of the control signal regarding said FM/AM broadcasting.

A radio wave from FM broadcasting or AM broadcasting and corresponding to the frequency set by the information processing device 90 is received through the first antenna element 31, and is subjected to tuning, demodulation, and A/D conversion by the first processing unit 42*a*. The signal subjected to the tuning, the demodulation, and the A/D conversion by the first processing unit 42*a* is transmitted to the information processing device 90 through the second connector 52, the cable 53, and the gateway ECU 80. Thereafter, the audio signal is output from a speaker of the information processing device 90, and the data and the image signal are output on a monitor of the information processing device 90.

The second processing unit (communication module) 42*b* is connected to the second antenna element 32.

The second processing unit 42*b* performs mobile communication such as call origination with a telephone line on the basis of a communication standard such as LTE (long term evolution), MIMO (multiple-input and multiple-output), or 5G.

A control signal from the information processing device 90 and regarding mobile communication is transmitted to the second processing unit 42*b* through the gateway ECU 80, the cable 53, and the second connector 52. The second processing unit 42*b* operates on the basis of the control signal regarding said mobile communication.

An audio signal from a microphone of the information processing device 90 is transmitted to the second processing unit 42*b* through the gateway ECU 80, the cable 53, and the second connector 52. The audio signal from the microphone of the information processing device 90 is subjected to D/A conversion and modulation by the second processing unit 42*b*. The signal subjected to the D/A conversion and the modulation is sent, through the second antenna element 32, to a terminal in a call state with the second processing unit 42*b*.

An audio signal, an image signal, and data from the terminal in the call state with the second processing unit 42*b* are received through the second antenna element 32. The audio signal, the image signal, and the data from the terminal are subjected to demodulation and A/D conversion by the second processing unit 42*b*. The signal subjected to the demodulation and the A/D conversion by the second processing unit 42*b* is transmitted to the information processing device 90 through the second connector 52, the cable 53, and the gateway ECU 80. Thereafter, the audio signal is output from the speaker of the information processing device 90, and the data and the image signal are output on the monitor of the information processing device 90.

The third processing unit (position calculation module) 42*c* is connected to the third antenna element 33 through the first connector 51 and the first substrate 41.

The third processing unit 42*c* receives position information and time information of the satellite through the third antenna element 33. The third processing unit 42*c* calculates position information (latitude and longitude information) of the vehicle on the basis of the position information and the time information of the satellite.

The signal including the position information and the time information of the satellite is received through the third antenna element 33, and is subjected to demodulation, conversion of the vehicle position information and A/D conversion, by the third processing unit 42*c*.

The position information of the vehicle is subjected to the A/D conversion by the third processing unit 42*c* and then transmitted to the information processing device 90 through the second connector 52, the cable 53, and the gateway ECU 80. The position information of the vehicle is used by the information processing device 90.

The fourth processing unit (V2X module) 42*d* is connected to the fourth antenna element 34.

The fourth processing unit 42*d* performs at least one of modulation processing and demodulation processing for transmission and reception of a signal through the fourth antenna element 34.

Own-vehicle information including position information, velocity information, and time information is subjected to modulation by the fourth processing unit 42*d*. The signal subjected to the modulation by the fourth processing unit 42*d* is sent through the fourth antenna element 34.

Information from the outside of the vehicle is received through the fourth antenna element 34, and is subjected demodulation and A/D conversion by the fourth processing unit 42*d*. The signal subjected to the demodulation and the A/D conversion by the fourth processing unit 42*d* is transmitted to the information processing device 90 through the second connector 52, the cable 53, and the gateway ECU 80. Thereafter, the audio signal is output from the speaker of the information processing device 90, and the data and the image signal are output on the monitor of the information processing device 90. The information from the outside of the vehicle is another-vehicle information including position information, velocity information, and time information; information from a roadside device; and information from a mobile terminal.

The fifth processing unit (SXM/DAB module) is connected to the fifth antenna element 35 through the first connector 51 and the first substrate 41.

The fifth processing unit 42*e* performs tuning/demodulation processing and A/D conversion processing for reception of a signal through the fifth antenna element 35.

A control signal from the information processing device 90 and regarding digital broadcasting is transmitted to the fifth processing unit 42*e* through the gateway ECU 80, the cable 53, and the second connector 52. The fifth processing unit 42*e* operates on the basis of the control signal regarding said digital broadcasting.

A radio wave from digital broadcasting and corresponding to the frequency set by the information processing device 90 is received through the fifth antenna element 35, and is subjected to tuning, demodulation, and A/D conversion by the fifth processing unit 42*e*. The signal subjected to the tuning, the demodulation, and the A/D conversion by the fifth processing unit 42*e* is transmitted to the information processing device 90 through the second connector 52, the cable 53, and the gateway ECU 80. Thereafter, the audio signal is output from the speaker of the information processing device 90, and the data and the image signal are output on the monitor of the information processing device 90.

(First Connector 51, Second Connector 52, Cable 53)

Next, the first connector 51, the second connector 52, and the cable 53 will be described.

The first connector 51 is used for electrical connection between the first substrate 41 and the second substrate 42 and for holding the base 21 by the second antenna case 12.

The upper portion of the first connector 51 is connected to the first substrate 41 through the third through hole 21*a*.

The lower portion of the first connector 51 is connected to the second substrate 42 through the first through hole 12*a*.

The second connector 52 is used for connecting the second substrate 42 and the cable 53.

The second connector 52 is connected to the second substrate 42 through the second through hole 12*b*.

The cable 53 is a LAN cable that connects between the second connector 52 and the gateway ECU 80.

(Resin Roof 70)

Next, the resin roof 70 will be described.

The resin roof 70 is located above in the z direction of the first antenna case 11 and the second antenna case 12.

The resin roof 70 has the protruding region 71 and the flat region 72 provided integrally.

The protruding region 71 inclines such that the front portion in the x direction is lower in level than the rear portion in the x direction, and has a shark-fin shape in which both side surfaces are curved inward.

The flat region 72 is formed around the lower end of the protruding region 71.

The first antenna case 11 is disposed below the protruding region 71 in the z direction.

The second antenna case 12 is disposed below in the z direction of the protruding region 71 and the flat region 72.

(Gateway ECU 80, Information Processing Device 90)

Next, the gateway ECU 80 and the information processing device 90 will be described.

The gateway ECU 80 performs, through the in-vehicle LAN, transmission and reception of a signal to/from an electronic device installed in the vehicle such as the information processing device 90.

The information processing device 90 is a device such as a car navigation system or an audio device that outputs information as at least one of audio and movie.

Second Embodiment

Figure 5:
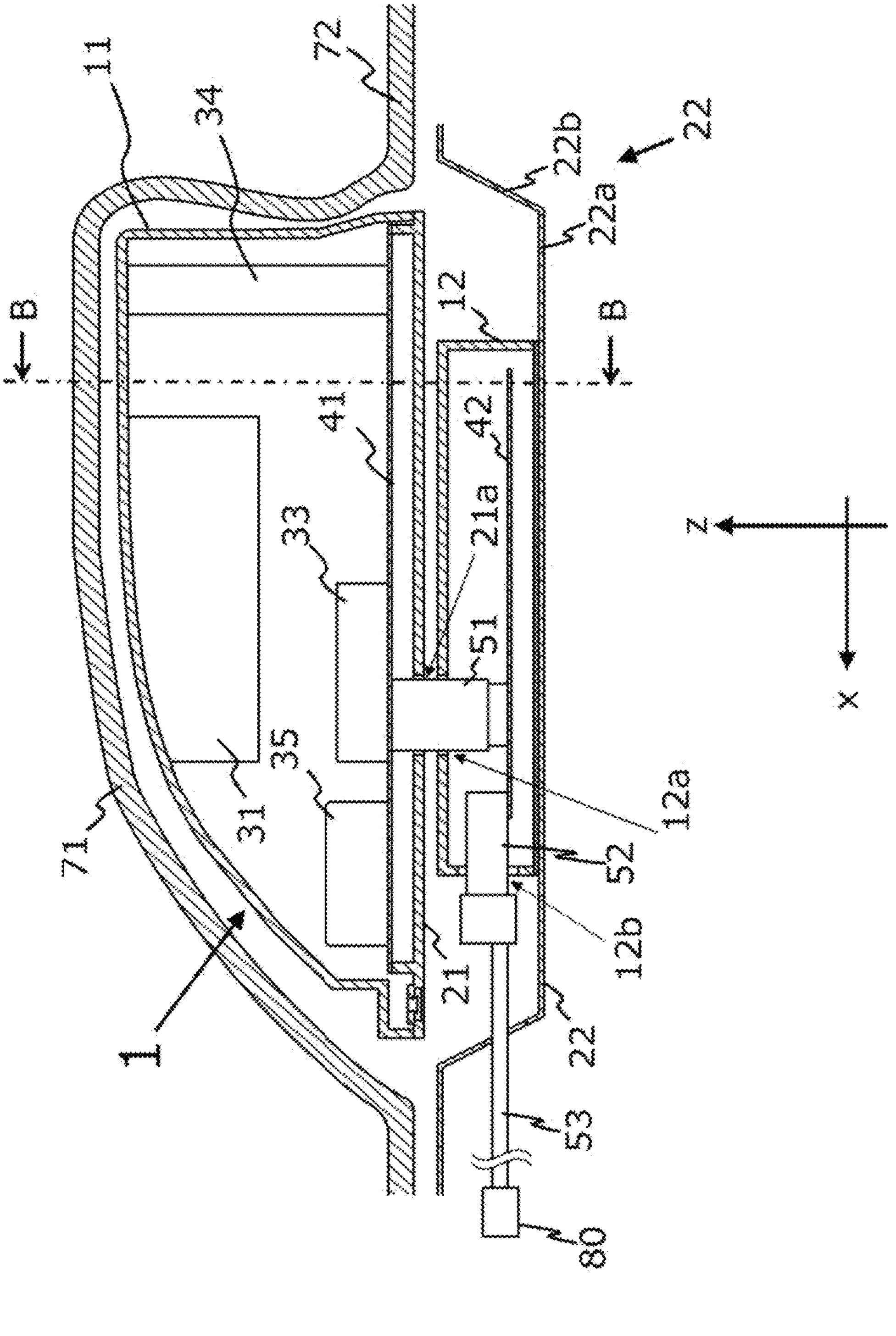
FIG. 5 is a section view taken along line A-A of FIG. 1, and illustrates the configuration of the antenna device for vehicle according to the second embodiment.
Figure 6:
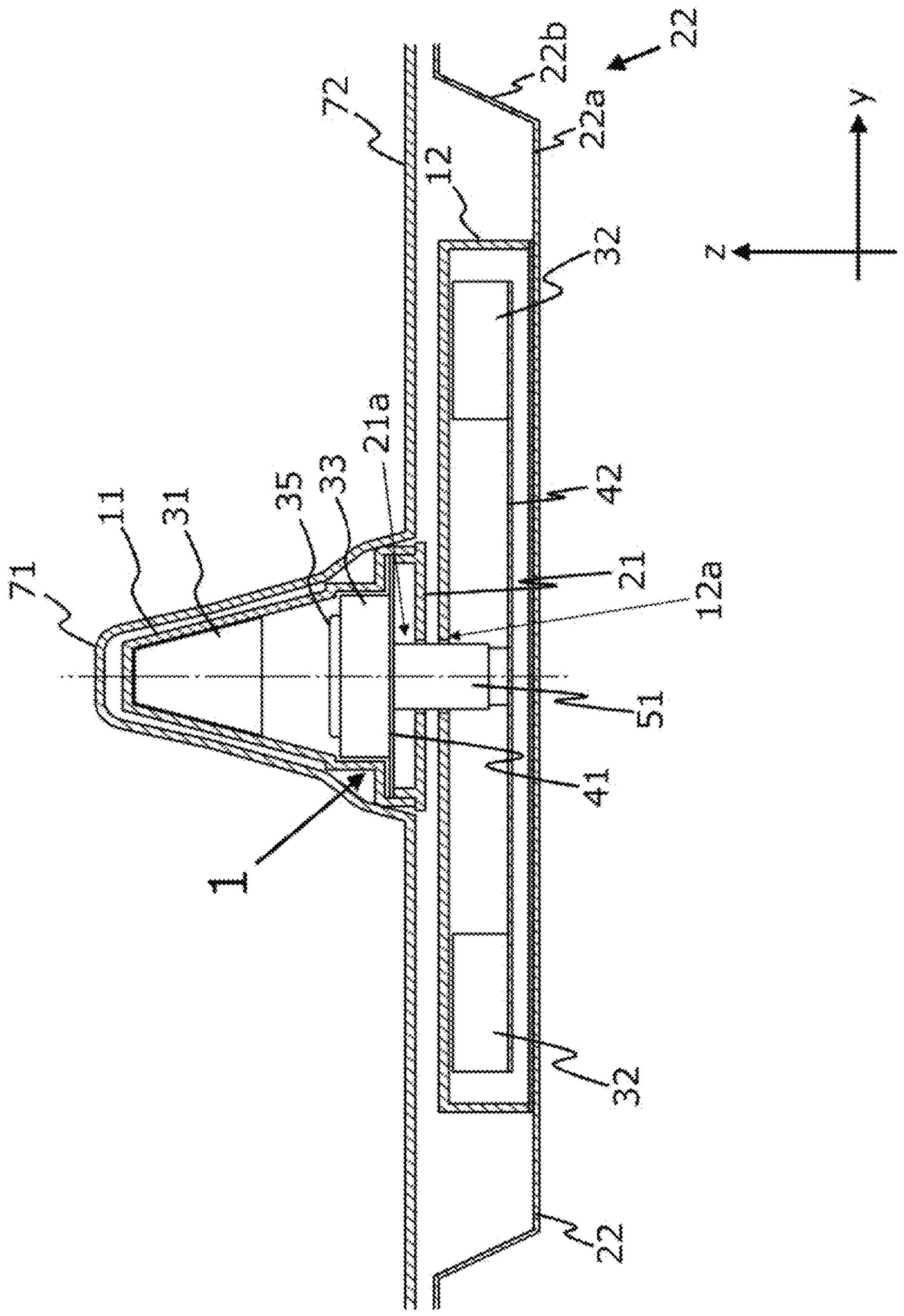
FIG. 6 is a section view taken along line B-B of FIG. 5.

Next, a second embodiment will be described (see FIGS. 5 and 6).

In the first embodiment, there has been described that the fourth antenna element 34 is provided in the second antenna case 12.

In the second embodiment, the fourth antenna element 34 is disposed in a space formed between the first antenna case 11 and the base 21.

In this case, the fourth antenna element 34 is held by the first substrate 41.

The fourth antenna element 34 is electrically connected to the fourth processing unit 42*d* of the second substrate 42 through the first substrate 41 and the first connector 51.

Third Embodiment

Figure 7:
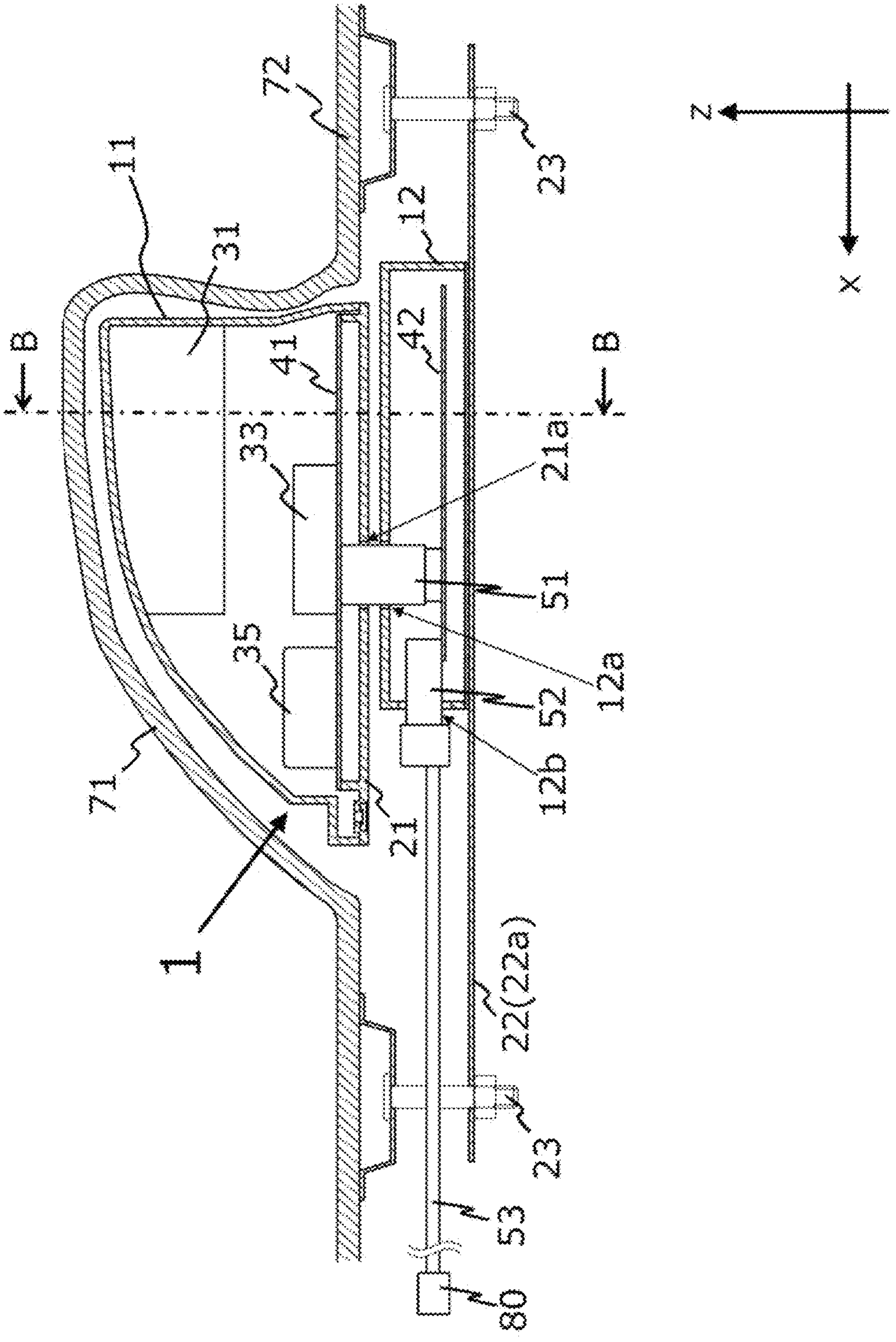
FIG. 7 is a section view taken along line A-A of FIG. 1, and illustrates the configuration of the antenna device for vehicle according to the third embodiment.
Figure 8:
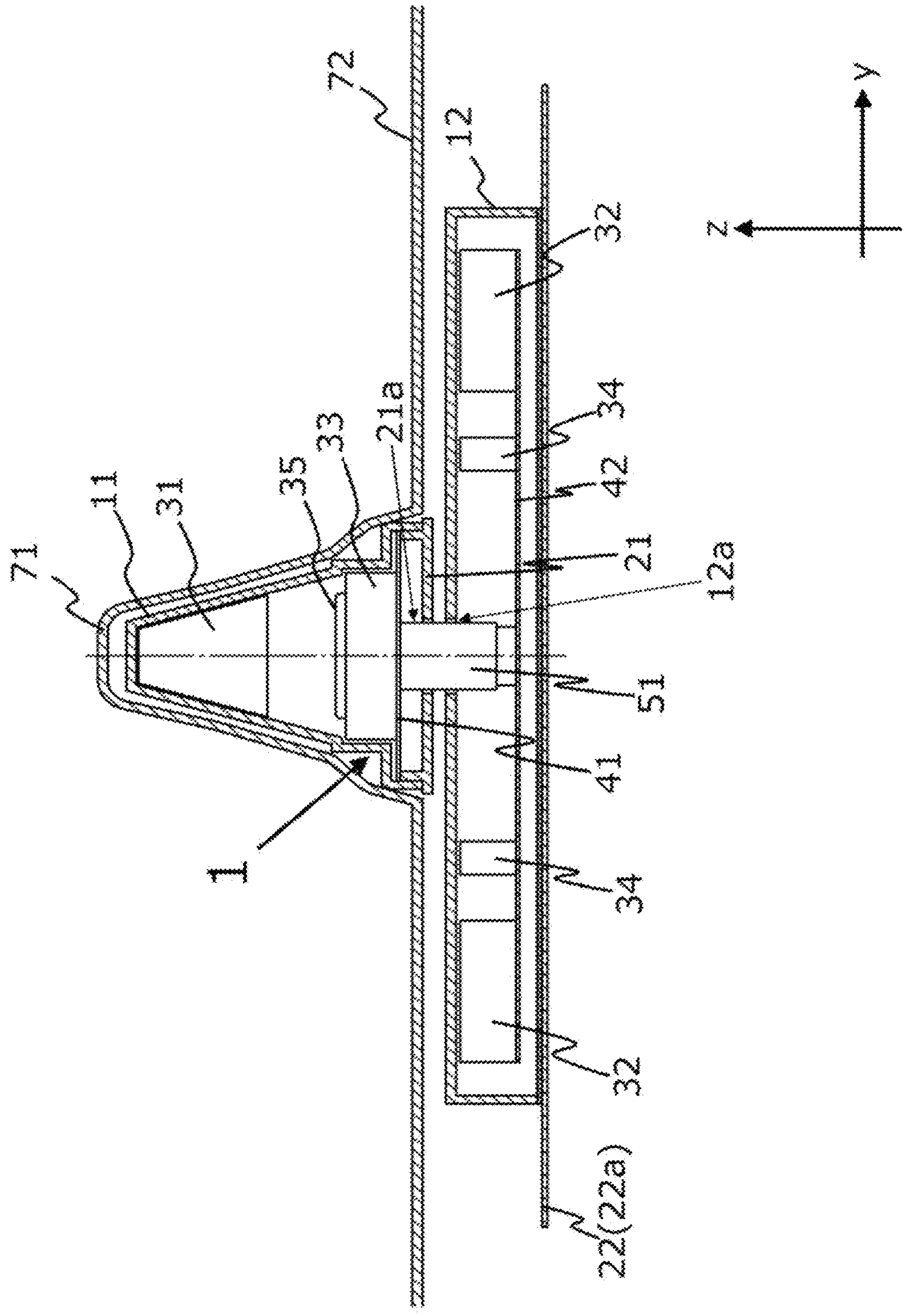
FIG. 8 is a section view taken along line B-B of FIG. 7.

Next, a third embodiment will be described (see FIGS. 7 and 8).

In the first embodiment and the second embodiment, there has been described that the metal member of part of the vehicle such as the metal roof constitutes as the ground plate 22.

In the third embodiment, a metal member separate from the vehicle constitutes as a ground plate 22.

In this case, the ground plate 22 is attached to a frame though connecting members 23 such as attachment fittings. The term "the frame" here is the resin roof 70, or a frame provided at the compartment side of the vehicle compared to the resin roof 70 and holding the resin roof 70.

The third embodiment exemplifies that the ground plate 22 is attached to the lower portion of a flat region 72 of the resin roof 70 through the connecting members 23.

Effects of Invention

In the first embodiment to third embodiment, the second antenna element 32 is provided below the flat region 72 of the resin roof 70 in the z direction. Therefore, it becomes to be not increased the dimension of the portion disposed above the flat region 72 of the roof, in particular, the dimensions in the x direction and the y direction, in the antenna device for vehicle 1 including the plurality of antennas (at least the first antenna element 31 and the second antenna element 32), as compared with a form in which a member regarding the second antenna element 32 in the antenna device for vehicle 1 is disposed above the flat region 72 in the z direction.

The ground plate 22 larger than the second antenna element 32 is provided. Therefore, it becomes easier to secure the antenna performance of the second antenna element 32, as compared with a form in which a larger ground plate 22 is not provided.

The base 21 of the first antenna element 31 is provided above the second antenna element 32 in the z direction. Therefore, it becomes easier to secure the antenna performance of the first antenna element 31, as compared with a form in which the base 21 is not provided between the first antenna element 31 and the second antenna element 32.

The second antenna case 12 placed on the ground plate 22 holds the base 21. Therefore, it becomes easier to attach the first antenna case 11 and the second antenna case 12 to the vehicle, as compared with a form in which the first antenna case 11 attached to the base 21 is fixed to the vehicle through a member different from the second antenna case 12.

The second antenna element 32 is disposed so as not to overlap the base 21 in the z direction in positional relationship. Therefore, it becomes easier to secure the antenna performance of the second antenna element 32, as compared with a form in which the second antenna element 32 is disposed so as to overlap the base 21 in the z direction in positional relationship.

The second antenna element 32 is disposed so as not to overlap the first antenna element 31 in the z direction in positional relationship. The second antenna element 32 is provided below the flat region 72 of the resin roof 70 in the z direction. Therefore, it becomes to be not increased the dimension of the portion disposed above the flat region 72 of the roof, in the antenna device for vehicle 1 including the plurality of antennas, even if the second antenna element 32 is disposed in such a positional relationship.

The signal processing unit is provided on the second substrate 42, and a digital signal subjected to signal processing is transmitted to an electronic device such as the information processing device 90 installed in the vehicle. Therefore, it enables with smaller attenuation, to transmit a signal to the electronic device installed in the vehicle, as compared with a form of transmission in analog-signal form.

The antenna device for vehicle 1 receives a digital signal from the electronic device installed in the vehicle, and the signal processing unit of the second substrate 42 performs signal processing. Therefore, it enables, with smaller attenuation, to receive a signal from the electronic device installed in the vehicle, as compared with a form of reception of an analog signal.

The second antenna element 32 is disposed so as not to overlap the first antenna element 31 in the z direction in positional relationship, which enables a large distance between the second antenna element 32 and the first antenna element 31. Therefore, it becomes easier to secure the antenna performance of the second antenna element 32, as compared with a form in which the second antenna element 32 is disposed so as to overlap the first antenna element 31 in the z direction in positional relationship.

The fourth antenna element 34 is disposed so as not to overlap the second antenna element 32 in the z direction in positional relationship, which enables a large distance between the fourth antenna element 34 and the second antenna element 32. Therefore, it becomes easier to secure the antenna performance of the fourth antenna element 34, as compared with a form in which the fourth antenna element 34 is disposed so as to overlap the second antenna element 32 in the z direction in positional relationship. The fifth antenna element 35 is disposed so as not to overlap the second antenna element 32 in the z direction in positional relationship, which enables a large distance between the fifth antenna element 35 and the second antenna element 32. Therefore, it becomes easier to secure the antenna performance of the fifth antenna element 35, as compared with a form in which the fifth antenna element 35 is disposed so as to overlap the second antenna element 32 in the z direction in positional relationship.

Other Embodiments

In the first embodiment to third embodiment, there has been described that the first antenna case 11 and the second antenna case 12 are provided separately, and the first antenna case 11 and the second antenna case 12 are connected through the first connector 51 and the base 21.

However, in one embodiment, the first antenna case 11 may be integrally provided with the second antenna case 12.

For example, one embodiment is conceivable in which the lower end of the first antenna case 11 is connected to the upper surface of the second antenna case 12 and the first antenna case 11 and the second antenna case 12 constitute one antenna case.

In the first embodiment to third embodiment, there has been described that the protruding region 71 and the flat region 72 are integrally formed as the resin roof 70.

However, in one embodiment, the protruding region 71 and the flat region 72, may be constituted separately.

For example, one embodiment is conceivable in which a waterproof insulating member made of rubber is provided between the protruding region 71 and the flat region 72.

In addition, the fourth antenna element 34 includes the antenna element for vehicle-to-vehicle communication, road-to-vehicle communication, or vehicle-to-mobile terminal communication, that is V2X communication, based on the IEEE 802.11p standard. However, the antenna device for vehicle 1 may include an antenna element for cellular V2X communication, or may include an antenna element for DSRC (dedicated short range communications).

In the first embodiment to third embodiment, there has been described that the antenna device for vehicle 1 includes the five antenna elements as the first antenna element 31 to the fifth antenna element 35. However, in one embodiment, an antenna device for vehicle 1 may have four or less antenna elements, or may have six or more antenna elements.

In addition, in one embodiment, any of the first antenna element 31 to the fifth antenna element 35 may be used for wireless LAN (Wireless Local Area Network, communication based on the IEEE 802.11 standard), short-range wireless communication (communication based on the IEEE 802.15 standard, such as Bluetooth (registered trademark)), or the like.

The embodiments of the present invention have been described; however, the embodiments have been presented as examples, and thus are not intended to limit the scope of the invention. The embodiments can be implemented in various other forms, and thus various omissions, substitutions, and changes can be made without departing from the gist of the invention. The embodiments and modifications thereof are included in the scope or gist of the invention, and are included in the invention described in the claims and the equivalent scope thereof.

According to the present specification, the following aspects are provided.

(First Aspect)

An antenna device for vehicle includes: a first antenna element; and a second antenna element. A resin roof has a protruding region and a flat region around a lower end of the protruding region, and at least an upper portion of the first antenna element is covered with the protruding region. The second antenna element is disposed below the flat region.

According to the first aspect, the second antenna element is provided below the flat region of the resin roof. Therefore, it becomes to be not increased the dimension of the portion disposed above the flat region of the roof, in particular, the dimensions in the front-and-rear direction and the left-and-right direction, in the antenna device for vehicle including a plurality of antennas (at least the first antenna element and the second antenna element), as compared with a form in which a member regarding the second antenna element in the antenna device for vehicle is disposed above the flat region.

(Second Aspect)

Preferably, the antenna device for vehicle according to the first aspect, further includes a ground plate. The ground plate is larger than the second antenna element.

According to the second aspect, it becomes easier to secure the antenna performance of the second antenna element, as compared with a form in which a ground plate larger than the second antenna element is not provided.

(Third Aspect)

Further preferably, the antenna device for vehicle further includes: a first substrate including a circuit related to the first antenna element; and a base holding the first substrate. The second antenna element is disposed below the base.

According to the third aspect, it becomes easier to secure the antenna performance of the first antenna element, as compared with a form in which no base is provided between the first antenna element and the second antenna element.

(Fourth Aspect)

More preferably, the antenna device for vehicle further includes: a first substrate including a circuit related to the first antenna element; a base holding the first substrate; a second substrate including a circuit related to the second antenna element; and a case for the second substrate. The second antenna element is disposed below the base. The case is placed on the ground plate. The base is held by the case.

According to the fourth aspect, the case placed on the ground plate holds the base. Thus, as compared with a form in a member attached to the base is fixed to the vehicle through a member different from the case, said member and the case are easily attached to the vehicle.

(Fifth Aspect)

More preferably, in the antenna device for vehicle, the ground plate is attached to a lower portion of the flat region through a connecting member.

(Sixth Aspect)

More preferably, in the antenna device for vehicle, the ground plate is part of a metal roof holding the resin roof.

(Seventh Aspect)

More preferably, the antenna device for vehicle, further includes: a second substrate including a circuit related to the second antenna element. The second substrate includes a signal processing unit that performs mutual conversion between a digital signal and an analog signal. The signal processing unit performs transmission and reception of a signal through the first antenna element and a signal through the second antenna element, to and from a gateway ECU of the vehicle.

According to the seventh aspect, it enables with smaller attenuation, to transmit and receive a signal to and from an electronic device installed in the vehicle, as compared with a form of transmission and reception in analog-signal form.

(Eighth Aspect)

More preferably, in the antenna device for vehicle, the second antenna element is disposed so as not to overlap the first antenna element in an up-and-down direction in positional relationship.

According to the eighth aspect, it enables a large distance between the second antenna element and the first antenna element. Therefore, it becomes easier to secure the antenna performance of the second antenna element, as compared with a form in which the second antenna element is disposed so as to overlap the first antenna element in the up-and-down direction in positional relationship.

(Ninth Aspect)

More preferably, the antenna device for vehicle, further includes: a third antenna element. The third antenna element is disposed at a position of the flat region where it does not overlap the second antenna element of the flat region in an up-and-down direction.

According to the ninth aspect, it enables a large distance between the third antenna element and the second antenna element. Therefore, it becomes easier to secure the antenna performance of the third antenna element, as compared with a form in which the third antenna element is disposed so as to overlap the second antenna element 32 in the up-and-down direction in positional relationship.

(Tenth Aspect)

More preferably, in the antenna device for vehicle, the first antenna element includes an antenna element for reception of terrestrial broadcasting, and the second antenna element includes an antenna element for mobile communication using a telephone line.

REFERENCE SIGNS LIST

1 antenna device for vehicle
11 first antenna case
12 second antenna case
12*a* first through hole
12*b* second through hole
21 base
21*a* third through hole
22 ground plate
22*a* holding surface
22*b* region around holding surface
23 connecting member
31 first antenna element (FM/AM)
32 second antenna element (LTE)
33 third antenna element (GNSS)
34 fourth antenna element (V2X)
35 fifth antenna element (SXM/DAB)
41 first substrate
42 second substrate
42*a* first processing unit (FM/AM tuner)
42*b* second processing unit (communication module)
42*c* third processing unit (position calculation module)
42*d* fourth processing unit (V2X module)
42*e* fifth processing unit (SXM/DAB module)
51 first connector
52 second connector
53 cable
70 resin roof
71 protruding region
72 flat region
80 gateway ECU
90 information processing device

The invention claimed is:

1. An antenna device for vehicle, comprising:
a first antenna element; and
a second antenna element,
wherein a resin roof has a protruding region and a flat region around a lower end of the protruding region,
at least an upper portion of the first antenna element is covered with the protruding region,
the second antenna element is disposed below the flat region,
a first substrate including a circuit related to the first antenna element; and
a base holding the first substrate,
wherein the second antenna element is disposed below the base.

2. The antenna device for vehicle according to claim 1, further comprising:
a ground plate,
wherein the ground plate is larger than the second antenna element.

3. The antenna device for vehicle according to claim 2, further comprising:
a second substrate including a circuit related to the second antenna element; and
a case for the second substrate, wherein
the case is placed on the ground plate, and
the base is held by the case.

4. The antenna device for vehicle according to claim 2, wherein the ground plate is attached to a lower portion of the flat region through a connecting member.

5. The antenna device for vehicle according to claim 2, wherein the ground plate is part of a metal roof holding the resin roof.

6. The antenna device for vehicle according to claim 1, further comprising:
a second substrate including a circuit related to the second antenna element,
wherein the second substrate includes a signal processing unit that performs mutual conversion between a digital signal and an analog signal, and
the signal processing unit performs transmission and reception of a signal through the first antenna element and a signal through the second antenna element, to and from a gateway electronic control unit (ECU) of the vehicle.

7. The antenna device for vehicle according to claim 1, wherein the second antenna element is disposed so as not to overlap the first antenna element in an up-and-down direction in positional relationship.

8. The antenna device for vehicle according to claim 1, further comprising:
a third antenna element,
wherein the third antenna element is disposed at a position of the flat region where it does not overlap the second antenna element in an up-and-down direction.

9. The antenna device for vehicle according to claim 1, wherein the first antenna element includes an antenna element for reception of terrestrial broadcasting, and
the second antenna element includes an antenna element for mobile communication using a telephone line.

* * * * *